Nov. 5, 1929.  W. S. ORR  1,734,044
THICKENER
Filed April 5, 1928  7 Sheets-Sheet 1
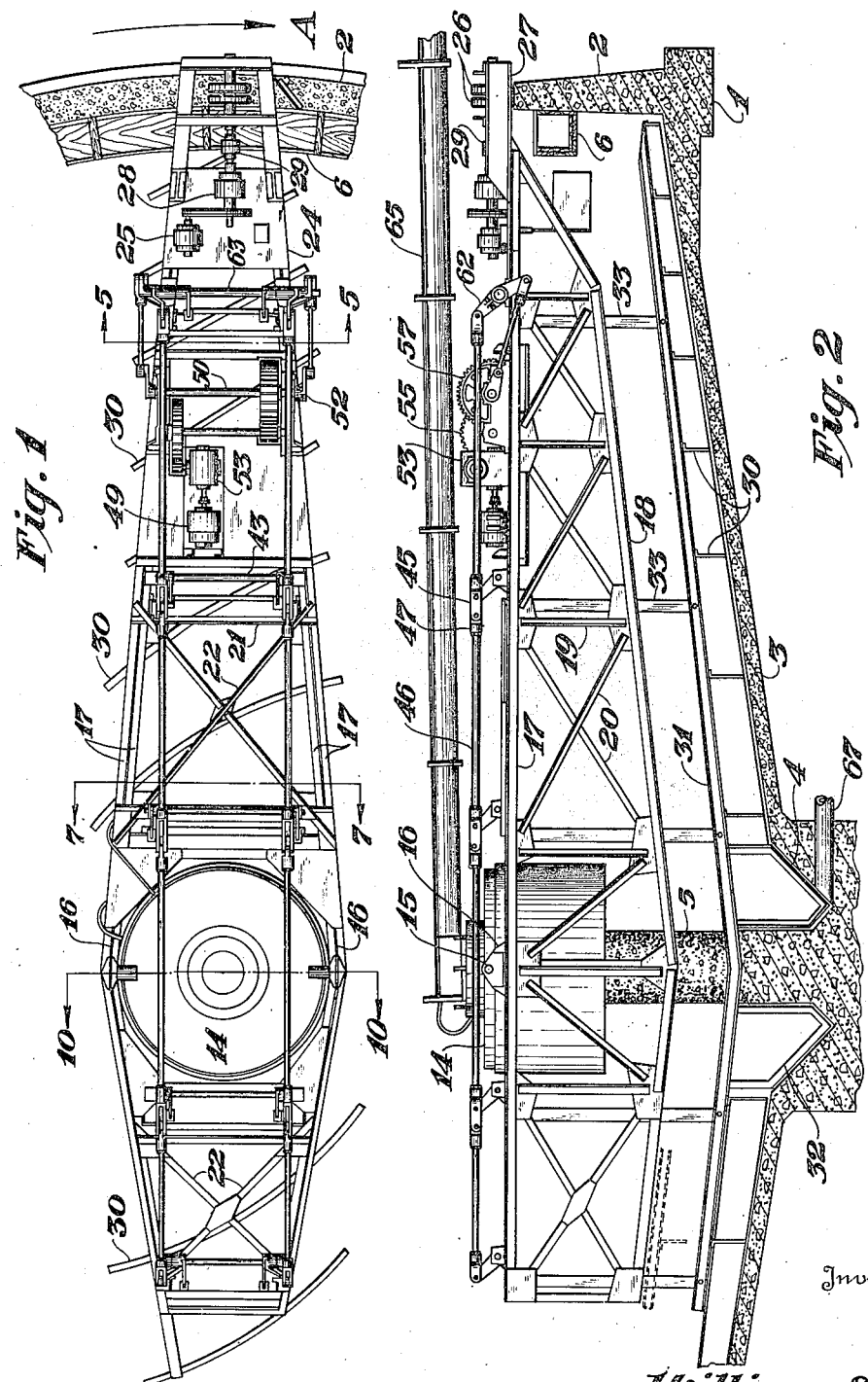
Inventor
William S. Orr
By William Icler Attorney

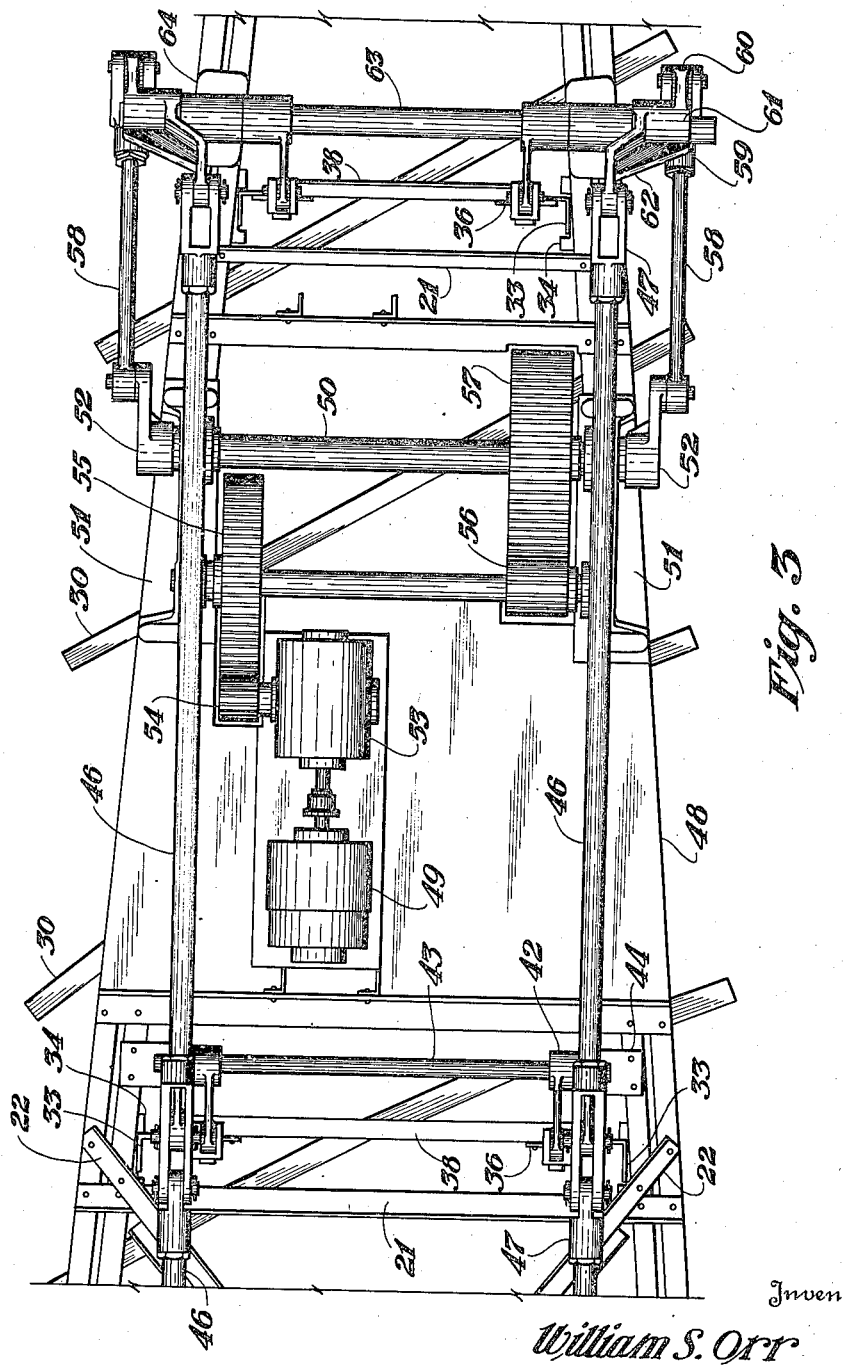

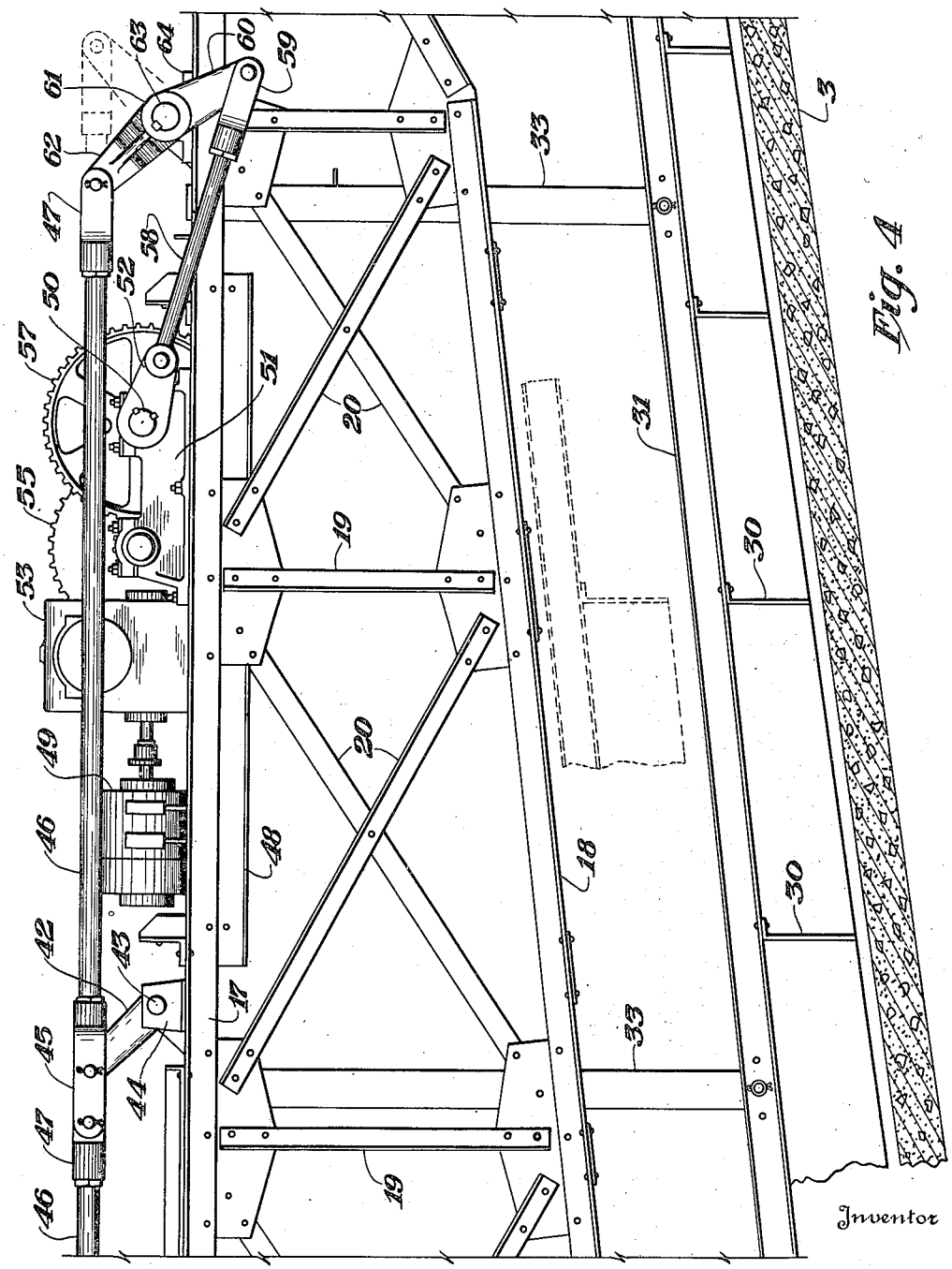

Nov. 5, 1929.  W. S. ORR  1,734,044
THICKENER
Filed April 5, 1928   7 Sheets-Sheet 4

Inventor
William S. Orr
By William Teler
Attorney

Nov. 5, 1929.  W. S. ORR  1,734,044
THICKENER
Filed April 5, 1928   7 Sheets-Sheet 5

Inventor
William S. Orr

By William Isler
Attorney

Nov. 5, 1929.                    W. S. ORR                    1,734,044
                                 THICKENER
                          Filed April 5, 1928        7 Sheets-Sheet 6

Inventor
William S. Orr
By William Isler
Attorney

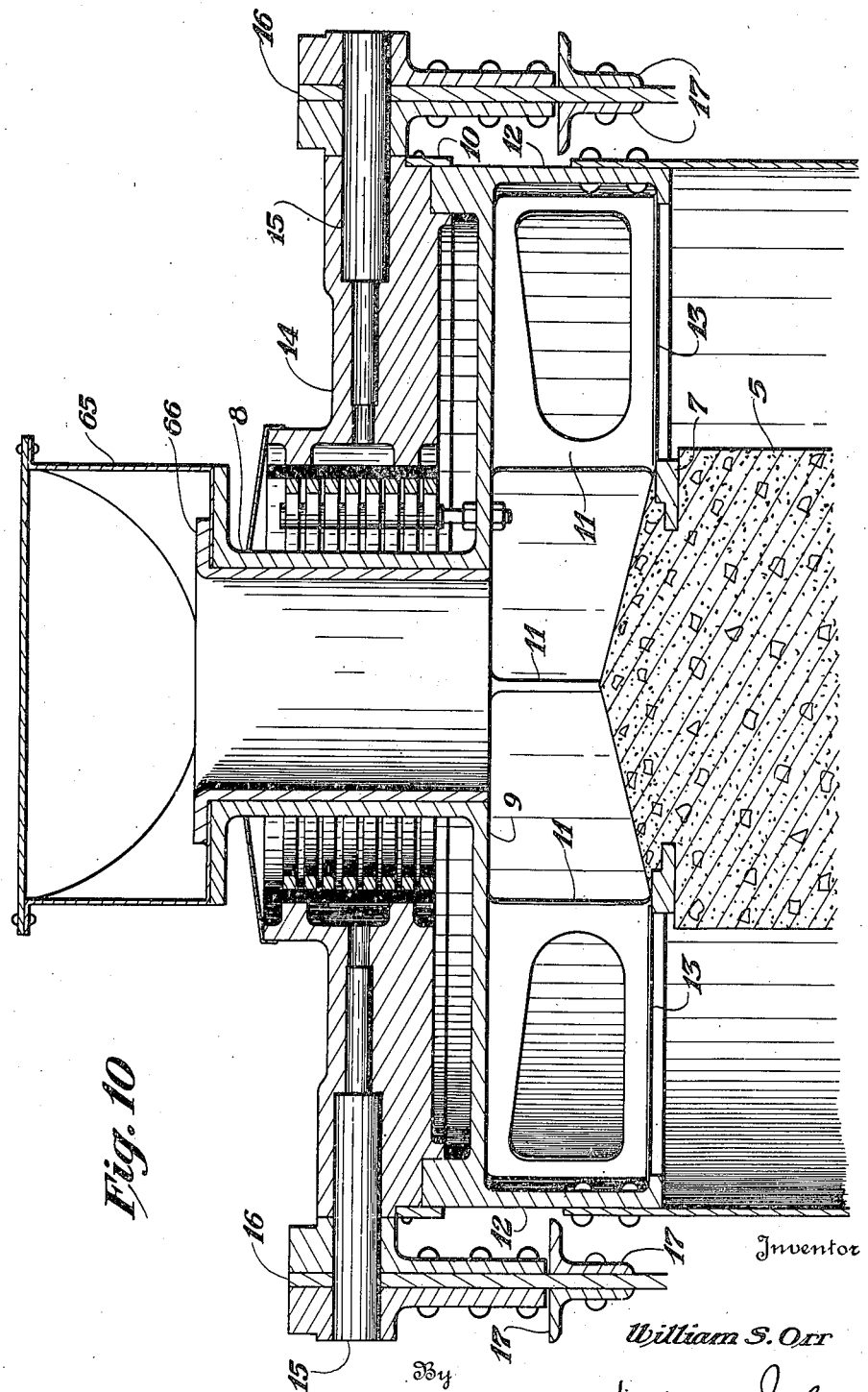

Patented Nov. 5, 1929

1,734,044

UNITED STATES PATENT OFFICE

WILLIAM S. ORR, OF MASSILLON, OHIO, ASSIGNOR TO CENTRAL ALLOY STEEL CORPORATION, OF MASSILLON, OHIO, A CORPORATION OF NEW YORK

THICKENER

Application filed April 5, 1928. Serial No. 267,644.

This invention relates in general to new and useful improvements in concentrating or decanting apparatus, and more particularly in that type of concentrating or decanting apparatus, known in the art as "thickeners".

In the treatment of blast furnace gases, preparatory to utilizing the gases in boilers, hot blast stoves, and the like, it is customary to pass the gases through a series of dust catchers and whirlers in which approximately 80% of the solid matter, consisting of ore dust and coke dust, is removed from the gases. The partially cleaned gases are then passed through a gas washer in which practically all of the remaining solid material is removed from the gases by the action of water sprays.

The resulting sludge or slime consisting principally of water and suspended particles of iron ore and coke dust is conducted through a trough or flume to a thickener of the general type described in the patent to Dorr, No. 1,356,608. The suspended matter settles on the inclined bottom of the thickener, and is moved or scraped to a central cone or hopper by means of scraper blades, the waste liquid overflowing into a launder from which it is continuously removed.

The thickened sludge is pumped from the cone or hopper through a suitable discharge pipe, and preferably to a filter, and the filtered residue is conveyed by an endless belt to a sintering apparatus in which it is sintered into lumps of a size and form suitable for recharging into the blast furnace.

In the plant in which the above-described process is in use, the sludge from the gas washer is permitted to flow into the thickener continuously, but about ten hours operation of the sintering apparatus is sufficient to satisfactorily handle the normal twenty-four hour output of dust from the blast furnace, and as a consequence, it becomes necessary to discontinue the flow of sludge from the thickener to the sintering apparatus for a period of approximately fourteen hours. During this period, and/or during a breakdown of the sintering apparatus, the thickened sludge accumulates on the bottom of the thickener, and the scraper blades must be kept rotating continuously to prevent them from becoming imbedded in the sludge which forms into a hard cake if it is not continuously agitated. If the power or rotating mechanism fails, as may frequently happen, and the scraper blades stop, they become so tightly imbedded in the cake, that it is impossible to resume the rotary motion of the blades.

It then becomes necessary to remove all of the superincumbent liquid from the thickener, and remove the thickened sludge or cake from the bottom, before the thickener can resume operations, considerable time and dust being lost as the result of these enforced shutdowns.

It is the primary object of the present invention to provide a thickener of the aforesaid type with readily accessible means for raising and lowering the scraper blades, so that when shut-downs of the aforesaid nature occur, the scraper blades can be lifted clear of the sludge bed, their rotary motion stopped, and the sludge permitted to settle to the bottom. The thickener then functions as a reservoir to collect the incoming sludge during the period that the sintering apparatus, for any of the aforesaid reasons, is not in operation.

The blades being raised above the level of the accumulating sludge bed obviates the necessity of keeping them in motion, and thereby saves considerable power, and wear and tear on the equipment. Furthermore the danger of not being able to resume the rotary motion of the scraper blades, when the sintering plant resumes operations and is ready to take sludge, is completely obviated.

When the sintering apparatus resumes operations, the rotary motion of the thickener may be resumed, and the blades gradually lowered into the accumulated sludge bed until they reach their normal position near the bottom of the tank.

This and other objects of the invention will become more readily apparent in the course of the following description of the invention, taken in connection with the accompanying drawings, wherein Fig. 1 is a plan view of a thickener in which is embodied the novel features of the present invention;

Fig. 2 is an elevation of the thickener, showing in solid lines, the normal position of the scraper blades, and in dotted lines, the extreme elevated position of the blades;

Fig. 3 is a portion of Fig. 1, on an enlarged scale;

Fig. 4 is a portion of Fig. 2, on an enlarged scale;

Fig. 10 is a cross-section through a portion of the pedestal and associated parts of the thickener, taken on the line 10—10 of Fig. 1.

Figure 5:
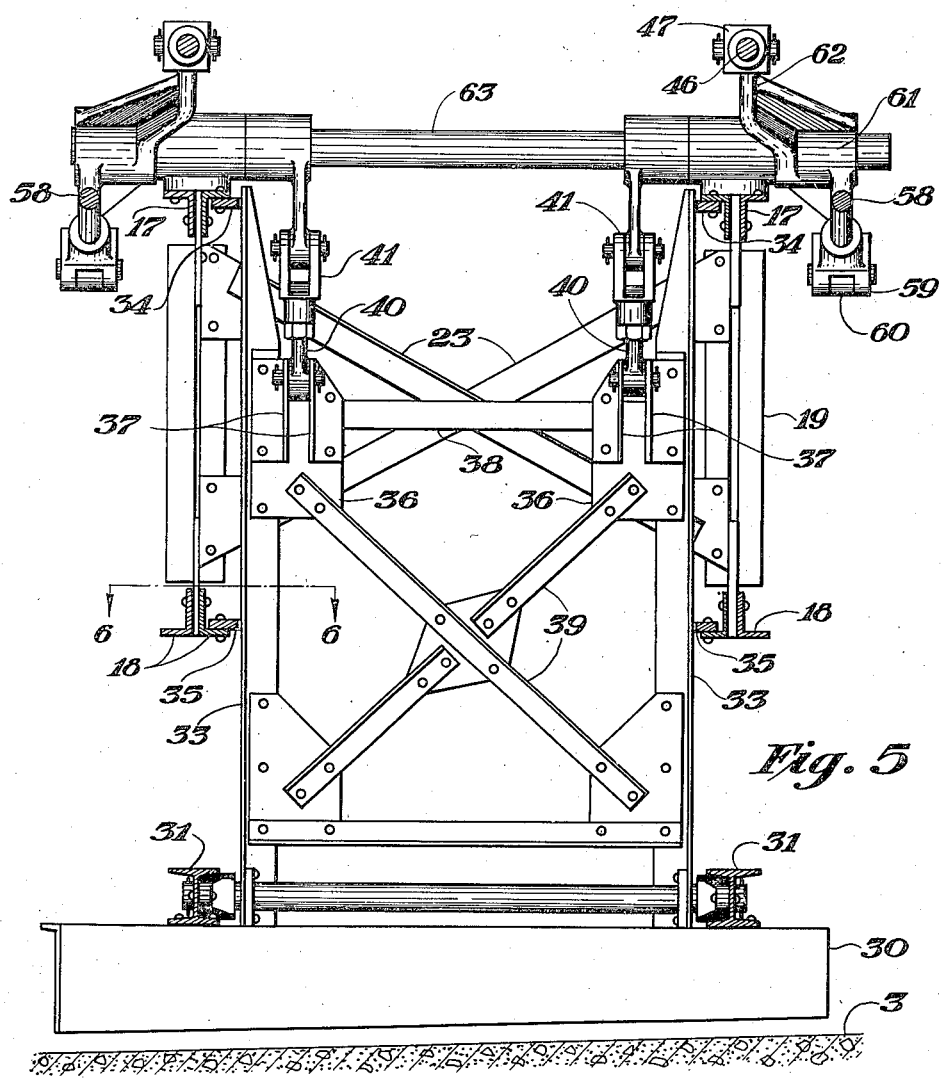
Fig. 5 is a cross-section through the thickener, taken on the line 5—5 of Fig. 1.
Figure 6:
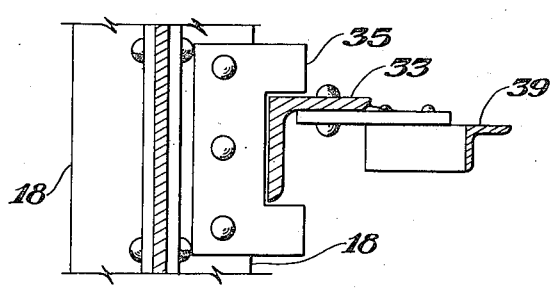
Fig. 6 is a fragmentary cross-section, taken on the line 6—6 of Fig. 5.
Figure 7:
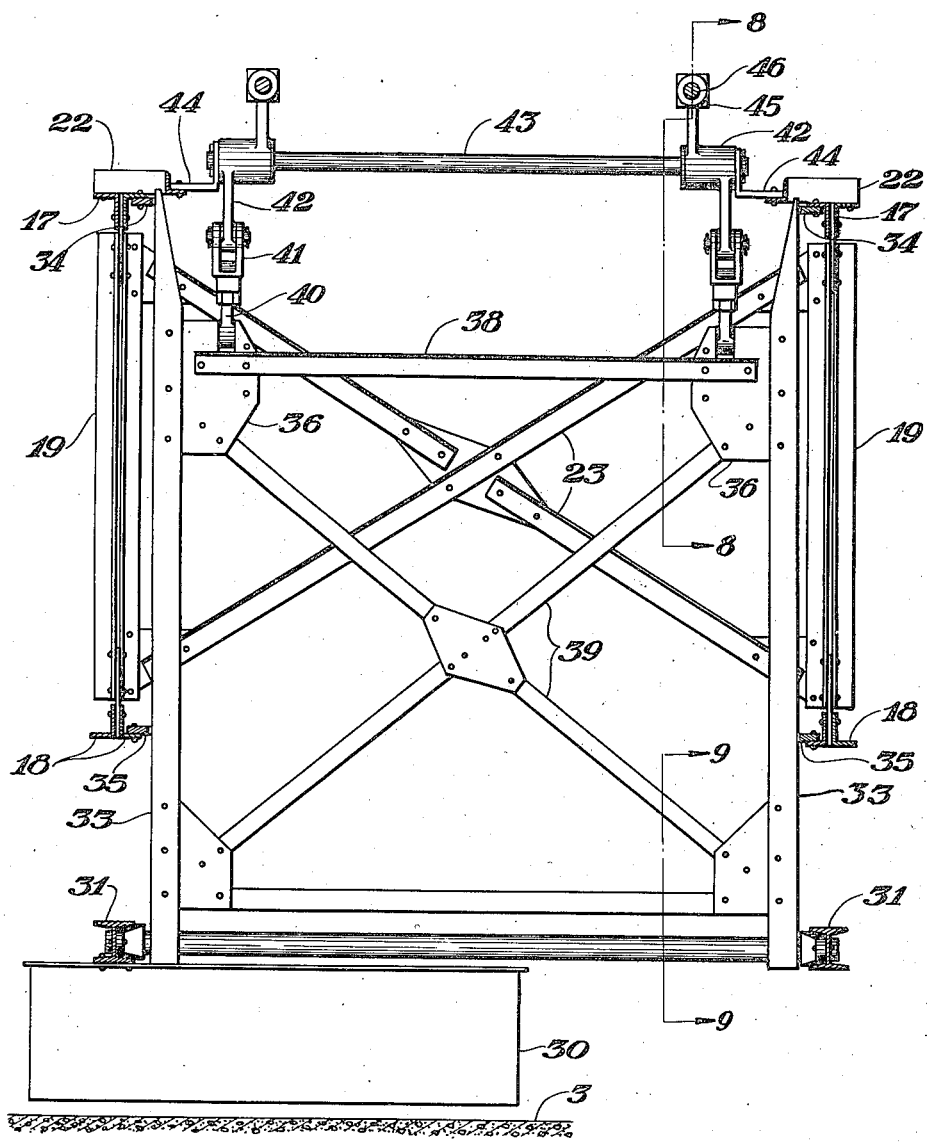
Fig. 7 is a cross-section through the thickener, taken on the line 7—7 of Fig. 1.
Figures 8, 9:
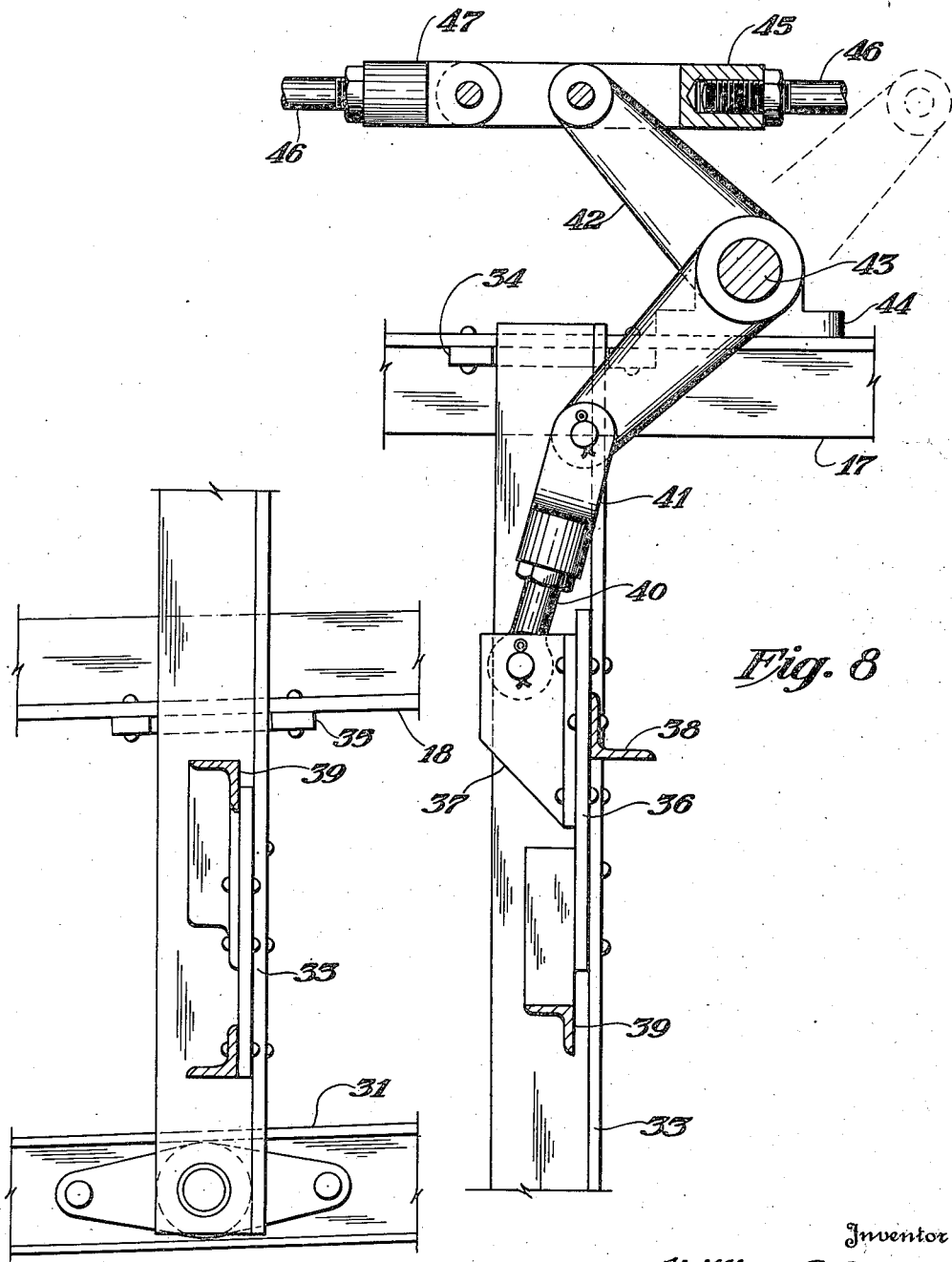
Fig. 8 is a cross-section through the thickener, taken on line 8—8 of Fig. 7, and showing one of the bell crank levers and associated portions of the scraper blade elevating mechanism.
Fig. 9 is a cross-section through the thickener, taken on the line 9—9 of Fig. 7, showing the lower portion of one of the uprights for elevating the scraper blades.

Referring more particularly to the drawings, the thickener consists of a shallow cylindrical concrete tank 1, having vertical side walls 2, and a sloping bottom 3 surrounding a centrally disposed cone or hopper 4, in the center of which a pedestal 5 is disposed. A circular wooden launder 6 is secured to the side walls 2, near the top thereof, the top of the launder being disposed slightly below the normal level of the fluid content of the thickener.

Disposed directly above the pedestal 5 is a cast iron spider 7, consisting of a cylindrical feed tube 8, terminating at its lower end in a disk-like body portion 9, provided with a peripheral track 10, as clearly shown in Fig. 10. Integrally secured to the lower face of the body portion 9 of the spider are a plurality of perforated radially disposed arms or ribs 11, to the outer ends of which is secured a skirt 12. The lower inner ends of arms 11 are permanently embedded in the upper end of the concrete pedestal 5. Coarse mesh screens 13 are disposed intermediate the arms 11.

A ring 14 is mounted to rotate on track 10, and the inner ends of stub shafts 15 are rigidly secured at diametrically opposite points in the ring. Pivotally mounted on the outer ends of stub shafts 15, are gusset plates 16, which serve as bearings for supporting the truss of the thickener.

The truss consists of pairs of longitudinally extending upper chord members 17, and pairs of lower chord members 18, suitably spaced from the chord members 17 by means of vertical web members 19 and diagonal braces 20. The chord members 17 on opposite sides of the truss are spaced from each other by means of horizontal web members 21 and diagonal braces 22. Additional strength is provided by means of cross-braces 23.

A platform 24 is secured on the chord members 17, near their outer ends, and a motor 25 is mounted thereon. Rubber covered traction wheels 26 are secured in suitable bearings mounted on an extension 27 of the truss, and are driven by the motor 25 through the intermediary of a gear reduction unit 28 and a flexible coupling 29. As shown in Figs. 1 and 2, the wheels 26 rest on the upper end of the side walls 2 of the tank.

Scraper blades 30 are secured at spaced intervals to longitudinally extending scraper arms 31, and auxiliary scraper blades 32, radially disposed with respect to the pedestal 5, are mounted in any suitable manner on the scraper arms 31, and extend into the cone or hopper 4.

Angle uprights 33, pivotally secured at their lower ends to scraper arms 31 are guided for vertical movement in plate guides 34 and 35 secured to the upper and lower chord members 17 and 18 respectively. Near its upper end, each upright 33 has secured thereto a gusset plate 36 to which a pair of angle bearing brackets 37 are secured. The angle uprights are spaced apart by means of cross-braces 38 and diagonal braces 39 secured to the gusset plates 36. An eye-bolt 40 is pivotally mounted in each pair of angle bearing brackets 37, and is adjustably secured at its upper end to a clevis 41, the latter in turn being secured to the lower end of a bell crank lever 42. Intermediate its ends, each bell crank lever 42 is mounted on a shaft 43 secured in suitable bearings 44 on the upper chord members 17. The upper end of each bell crank lever 42 is pivotally mounted in a clevis 45 in one end of which a connecting rod 46 is adjustably secured. The other end of each connecting rod 46 is adjustably secured in suitable bearings 47.

In the preferred embodiment of the invention shown in Figs. 1 and 2, ten uprights 33 are employed, necessitating the use of eight connecting rods 46.

A platform 48 is mounted on the upper chord members 17, and supports a motor 49. A shaft 50 mounted in bearings 51, has crank levers 52 secured to its ends, and is driven through the intermediary of a gear reduction unit 53, and gears 54, 55, 56, and 57. Connecting rods 58 are pivotally secured to the ends of crank levers 52, and the opposite ends of the connecting rods are adjustably secured to clevises 59. Clevises 59 are in turn pivotally secured to the lower arms 60 of drive bell crank lever 61, the upper arms 62 of which are pivotally secured to bearings 47 connected to the connecting rods 46 at the extreme right end as shown in Figs. 1 to 4 inclusive. The drive bell crank levers 61 are keyed to the ends of a shaft 63 which is mounted in suitable bearings 64 and secured in the upper chord members 17.

A flume 65 is provided for the delivery of the sludge to the thickener, and as shown in Figs. 2 and 10, one end of the flume rests upon a flange at the upper end of feed tube 8, and is retained in place thereon by means of a sleeve 66 which is caulked in place in the feed tube 8 to prevent leakage of sludge to the ring 14.

*Method of operation*

Sludge carried by the flume 65 enters the orifice in the sleeve 66 and flows between the arms 11 of the spider 7 into the tank 1, extremely coarse particles in the sludge being retained on screens 13.

The truss carrying the scraper blades 30 and auxiliary scraper blades 32 rotates in the direction indicated by the arrow A in Fig. 1, the scraper blades 30 forcing the settled thickened material from the sloping bottom 3 of the tank, to the cone or hopper 4, from which it is continuously removed by pumps through a discharge pipe 67. The auxiliary scraper blades 32 serve to stir up the sludge in the cone or hopper, and thereby facilitate the discharge of the thickened material through the discharge pipe.

During the operation of the sintering apparatus, the thickened sludge is pumped directly to the sintering plant. When the sintering plant is shut down, and the flow of sludge from the thickener discontinued, the scraper blades 30 and 32 are raised to any desired elevation by the partial rotation of the bell crank levers 42 and 61. The extreme upper position to which the blades may be raised is indicated by the dotted lines in Figs. 2 and 4. By the time the sintering plant resumes operations, the accumulation of thickened sludge will frequently have reached a depth of about eighteen inches, and will weigh as much as fifteen tons.

Upon resumption of operations in the sintering plant, the rotary movement of the truss is resumed. Motor 49 is then started, and the blades 30 and 32 are gradually lowered, thereby breaking up and bringing successive layers of the accumulated sludge into suspension in the superincumbent liquid. The blades are lowered until the entire sludge bed has been removed, and the thickener resumes normal operation, with the blades in their lowermost position as shown in Figs. 2 and 4.

Where the scraper blades have been inadvertently left in their lowermost position during the shut-down of the sintering plant, it then becomes necessary to raise the blades until they are clear of the sludge bed. They may then be gradually lowered in the manner above described.

Although the invention has been described particularly with reference to the reclaiming of blast furnace dust, it is to be understood that it may be used advantageously in connection with other industrial processes of a similar nature, and the scope of the invention is intended to be restricted only by the appended claims.

Claims:

1. In thickening apparatus, the combination of a truss mounted for movement in a horizontal plane, a second truss provided with scraper blades and movable horizontally with said truss, bell crank levers pivotally secured to said truss, connecting rods pivotally secured to the upper ends of the bell crank levers, and means mounted on the first-named truss for reciprocating the connecting rods to thereby cant the bell crank levers and move the second-named truss vertically with respect to the first-named truss.

2. A structure as defined in claim 1, in which the first-named truss is provided with members for positively guiding the second-named truss in its vertical movement.

3. In thickening apparatus, the combination of a truss mounted for rotary movement in a horizontal plane, a second truss provided with scraper blades and movable horizontally with said truss, bell crank levers pivotally secured to said trusses, connecting rods pivotally secured to the upper ends of the bell crank levers, and means mounted on the first-named truss for reciprocating the connecting rods to thereby cant the bell crank levers and move the second-named truss vertically with respect to the first-named truss.

4. A structure as defined in claim 3, in which the first-named truss is provided with members for positively guiding the second-named truss in its vertical movement.

In testimony whereof I affix my signature.

WILLIAM S. ORR.